J. SAGER.
FRUIT-PICKERS.
No. 184,547. Patented Nov. 21, 1876.
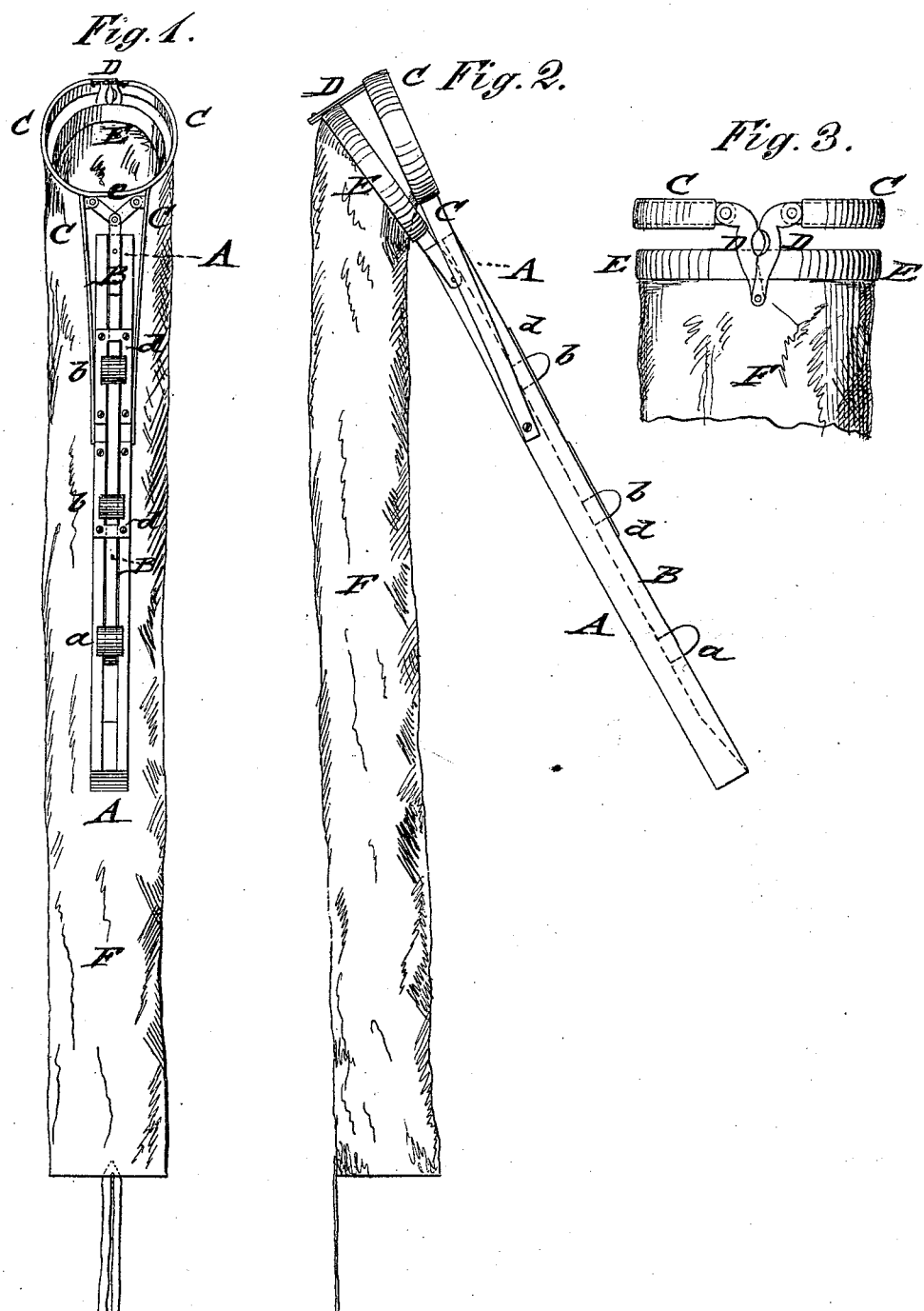

UNITED STATES PATENT OFFICE.

JOHN SAGER, OF AUGRES, MICHIGAN.

IMPROVEMENT IN FRUIT-PICKERS.

Specification forming part of Letters Patent No. 184,547, dated November 21, 1876; application filed August 7, 1876.

*To all whom it may concern:*

Be it known that I, JOHN SAGER, of Augres, in the county of Bay and State of Michigan, have invented a new and Improved Fruit-Picker, of which the following is a specification:

In the accompanying drawing, Figure 1 represents a front view, Fig. 2 a side view, and Fig. 3 an end view, of my improved fruit-picker.

Similar letters of reference indicate corresponding parts.

The object of my invention is to furnish an improved fruit-picker, by which the fruit may be cut in easy manner from the tree, without breaking limbs and injuring the coming buds, the fruit being conveyed from the picker directly to the basket without being bruised or injured.

The invention consists of a fruit-picker formed of spring-jaws having cutting-knives arranged above the hoop, to which the fruit-conveying hose or tube is attached, said cutters being operated by a sliding rod guided in the handle of the picker, and connected by pivot-links with the spring-jaws, all as hereinafter fully described.

In the drawing, A represents a staff or rod, of suitable length, that serves as a handle for the picking devices at the end of the same. The staff or handle A guides in a longitudinal groove the sliding rod B, by which the cutters are operated. The sliding rod B is taken hold of by a button, $a$, at the lower end, and its motion defined by stop-pins $b$, that come in contact with lateral bands or straps $d$ on the handle A. The upper end of the sliding rod B connects by pivot-links $e$ with spring-jaws C, that are applied to the upper end of the handle A, and curved to form a hoop-shaped part. The outer ends of the spring-jaws C are pivoted to cutters D, that are again pivoted by their lower ends to the fixed hoop E of the handle, to which the fruit-conveying hose or tube F is attached. The cutters D have curved cutting-recesses that close over the stem of the fruit, and cut the same close to the stem without breaking the limbs. It leaves also the butt of the stem to preserve the coming bud against being injured by the cold winds of winter. The hoop and spring-jaws are covered in suitable manner, to prevent the bruising of the fruit and to attach the hose conveniently. The hose F is made considerably larger than the staff, in order to give it sufficient slack while the operator is stepping to and fro, keeping his eye on the fruit and picker, so that it is not necessary to move the basket so often.

The lower end of the hose F is tied by strings to the bail of the basket. The operator holds the hose in his hands, together with the staff, a slack being given to the hose above each hand, so that the fruit is prevented from coming in contact with the hand. By taking off the upper hand the fruit passes to the lower hand, and by taking off the lower hand it passes to the basket, being by these interruptions conveyed in perfect manner to the basket.

The picker is placed directly under the fruit, and raised until the hoop comes in contact with the stem of the fruit, the picker being then moved slightly forward to cut the stem as close as possible to the fruit, and the sliding rod then pulled back for cutting. The hose then conducts the fruit, in the manner described, to the basket, delivering the same without getting bruised, and admitting thus the rapid and convenient picking of apples, pears, and other fruit.

Having thus described my invention, I claim as new and desire to secure by Letters Patent—

1. The combination of handle A, slide-rod B, spring-jaws C, connected by inside links with the rod, the cutters D, the fixed handle-hoop E, and the tube F, as and for the purpose described.

2. The combination, in a fruit-picker, of the stop-pins $b$ and straps $d$, the former on slide-rod B and the latter on handle A, as and for the purpose set forth.

JOHN SAGER.

Witnesses:
 JOHN HAMILTOM,
 JOSEPH CRAWFORD.